C. G. NEWLAND.
CLOTHES DRYING REEL.
APPLICATION FILED NOV. 5, 1917.
1,362,890.
Patented Dec. 21, 1920.
2 SHEETS—SHEET 1.
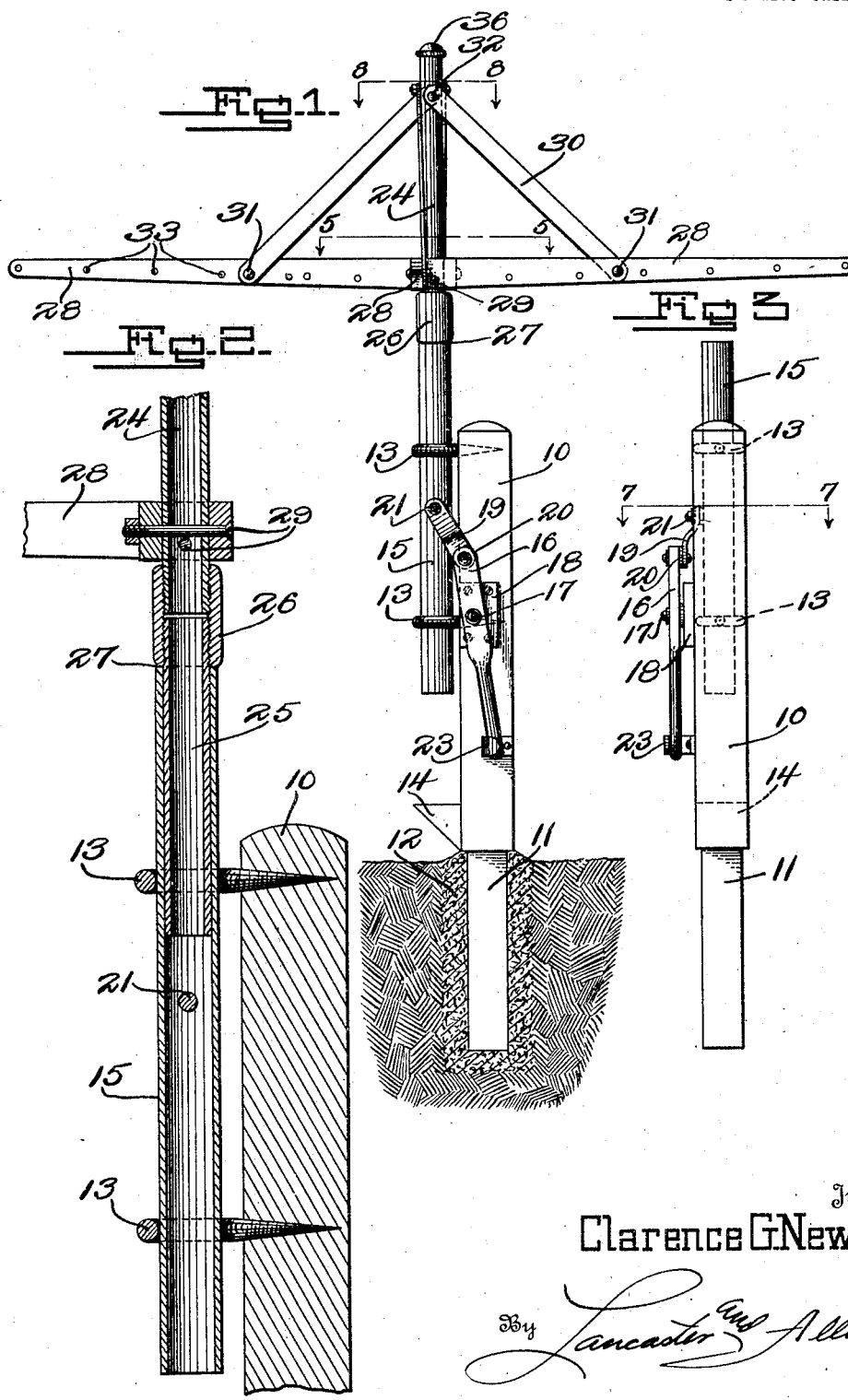
Inventor
Clarence G Newland
By Lancaster and Allwine
Attorneys

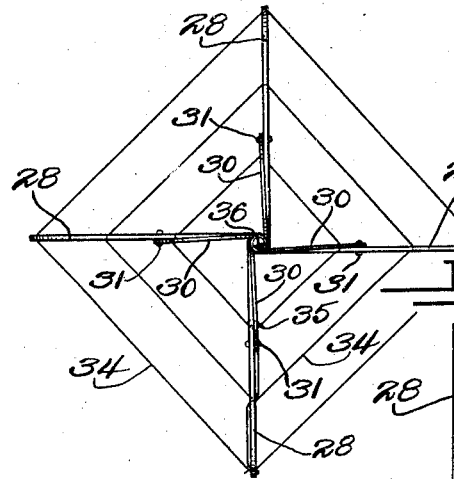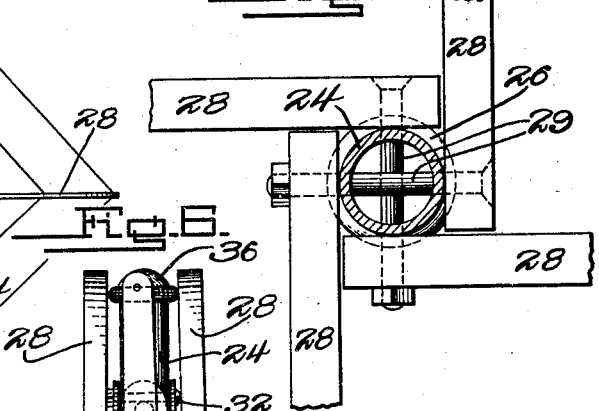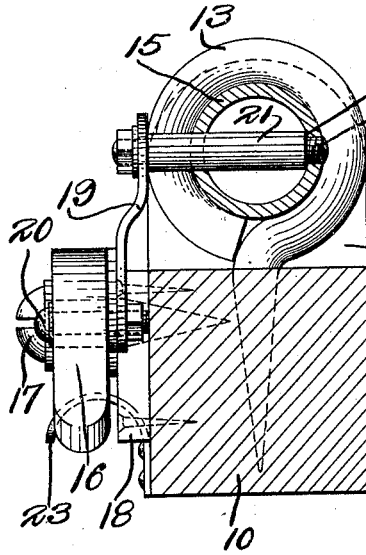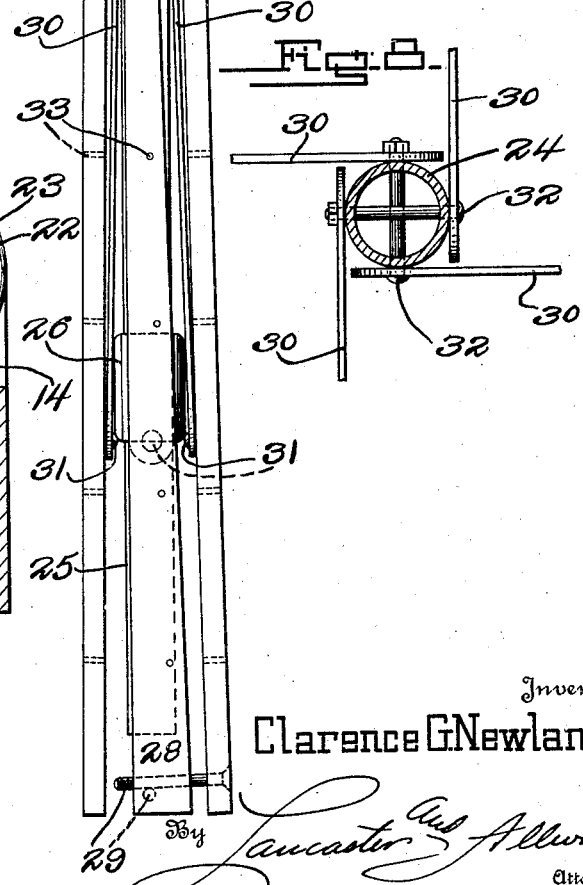

UNITED STATES PATENT OFFICE.

CLARENCE G. NEWLAND, OF BERLIN, MARYLAND.

CLOTHES-DRYING REEL.

1,362,890. Specification of Letters Patent. Patented Dec. 21, 1920.

Application filed November 5, 1917. Serial No. 200,391.

*To all whom it may concern:*

Be it known that I, CLARENCE G. NEWLAND, a citizen of the United States, and a resident of Berlin, in the county of Worcester and State of Maryland, have invented certain new and useful Improvements in Clothes-Drying Reels, of which the following is a specification.

The present invention relates to clothes drying reels, and has particular reference to a reel of the knock down and removable type.

An object of the present invention is to provide a clothes drying reel of this character which may be quickly set up and collapsed; a reel which may be elevated to a considerable height after the clothes have been applied to the line; a reel which is provided with a head carrying foldable and collapsible arms adapted to be swung into relatively small space; and to provide a drying reel comprising relatively few parts and capable of being economically manufactured.

The invention further aims at the provision of a clothes drying reel which may be constructed from substantially stock material or parts, and which may thus be economically produced or built up.

The above, and various other objects and advantages of this invention will be in part described, and in part understood, from the following detailed description of the present preferred embodiment, the same being illustrated in the accompanying drawings, wherein—

Figure 1 is a side elevation of a clothes drying reel constructed according to the present invention.

Fig. 2 is a fragmentary enlarged section taken through the socket and the portion of the stem which is supported upon and engages within the socket, the view also showing the connection between the socket and the post or standard.

Fig. 3 is a side elevation taken axially at right angles to the showing in Fig. 1, of the standard with the socket and the adjusting means therefor.

Fig. 4 is a top plan view of the reel head, disclosing diagrammatically the application of a clothes line to the arms of the reel head.

Fig. 5 is a fragmentary enlarged section taken through the reel head transversely thereof above the supporting arms and on the line 5—5 of Fig. 1.

Fig. 6 is an enlarged side elevation of the reel head collapsed.

Fig. 7 is a transverse section taken on the line 7—7 of Fig. 3, enlarged, and showing the adjustable connection between the socket and the standards.

Fig. 8 is a transverse section, enlarged, taken on the line 8—8 of Fig. 1, showing the connection of the brace arms with the post of the head.

The clothes drying reel, according to this invention, comprises a support, a socket mounted upon the support for vertical adjustment, and a head adapted to be held by the socket and raised and lowered by the adjustment of the same.

In the accompanying drawings, the support is disclosed in the form of a standard or post 10 provided with a stem or shank 11 extending axially thereof from the lower end and adapted for detachable insertion within a socket or opening suitably formed in a body of concrete 12, or the like. The concrete 12 comprises the base of the support, and the shank or projection 11 is adapted to be thrust into the opening in the base to retain the standard or post 10 upright. The post 10 is of suitable height and configuration, and is provided at one side with a pair of vertically spaced apart guides 13 which, in the present instance, are disclosed in the form of relatively large screw eyes arranged with their openings in vertical axial alinement. The standard 10 is also provided, in vertical alinement with the guides 13, with a foot or rest 14 presenting a relatively flat horizontal surface beneath the guides.

Slidably mounted in the guides 13 is a socket 15, the same being disclosed in the present instance as comprising a length of pipe adapted to fit snugly in the guides and to be moved vertically through a predetermined distance against the side of the post 10. The socket 15 when lowered is adapted to seat upon the rest or foot piece 14 and to be thus supported at one side of the standard. An elevating lever or handle 16 is pivoted intermediate its ends upon a bolt or pin 17 to one side of the standard 10 at right angles to the side from which the guides 13 project. A spacing block 18 is preferably arranged between the post 10 and the handle or lever 15 to space the latter a sufficient distance from the adjacent side of the standard to accommodate the end of a link 19 which is pivotally connected by bolts 20 to the end of the lever 16. The other end of the lever 16 is reduced and rounded to provide a handle portion which may be easily grasped within the hand. The other end of the link 19 extends sufficiently to engage the adjacent side portion of the socket 15, and is pivotally mounted thereagainst by means of a supporting pin 21. As shown in detail in Fig. 7, the pin 21 engages through a suitably formed aperture in the adjacent side of the socket 15 and is reduced and threaded upon its extremity to provide a stem 22 adapted for engagement in the other or opposite wall of the socket, and forming a shoulder 23 adapted to engage said opposite wall to retain the pin 21 from longitudinal movement through the socket. The stem 22 is adapted to engage through a relatively small opening formed in said opposite wall of the socket, and the stem may be in threaded engagement with the socket to hold the supporting pin therein. The standard 10 is provided, at a point below the pivot pin 17 with a stop hook 23 arranged to receive the handle portion of the lever 16 when the latter is swung into a position to raise the link 19. It will be noted from Fig. 1 that the stop 23 is so arranged that the pivot 20 may move past the dead center between the pivotal point of the link 19 with the socket 15 and the lever 16 with the pin 17. Thus, the weight of the socket 15 with the reel head mounted thereon retains the handle portion of the lever 16 within the stop hook 23.

The head comprises a central or axial member of preferably tubular form having an upper post part 24 and a lower stem part 25. These parts comprise tubular sections which are connected together by a union coupling 26 in the form of a sleeve or thimble oppositely screw-threaded in opposite ends to receive the adjacent extremities of the sections 24 and 25. The sleeve 26 provides a shoulder 27 upon its lower end adapted to seat upon the upper end of the socket 15 and support the head thereon, and admit of the rotation of the head upon the socket. The stem 25 projects into the socket 15 sufficiently to anchor and retain the head from accidental displacement incident to wind pressure, jarring and the like against the head.

The post section 24 is provided with a plurality of radiating arms 28 which, in the present instance are disclosed as being four in number and having their inner ends detachably secured to the post 24 upon bolts 29, or the like, which pass diametrically through the post 24 at points immediately above the coupling sleeve 26. The bolts 29 each engage a pair of the arms 28, as shown in the present structure, and the bolts are crossed intermediate their ends, and extend through the inner portions of the arms 29 at different distances above the upper and lower edges thereof. Braces 30 which have their lower ends pivotally connected by pins 31 or the like to intermediate portions of the arms 28, have their upper ends detachably pivoted to the post 24, near the upper end of the latter, by means of bolts 32. As shown in Fig. 6, when the bolts 29 are disengaged from the post 20, the arms 28 may be swung downwardly at their inner ends and the braces 30 are drawn toward the axial line of the head and held together with the arms 28 in close contact therewith.

The arms 28 are provided with any number of openings 33 therethrough adapted to receive a clothes line 34. As shown in Fig. 4, the clothes line is preferably secured to one of the arms 28 at one end, by threading said end through the adjacent opening 33 and thus tying the end of the line to the arm, as shown at 35. The clothes line 34 is then carried to the next adjacent arm 28, threaded through the adjacent opening 33, and passed consecutively in a circular direction through all of the arms 28 and back to the original opening 33. The line 34 is then carried outwardly along the first arm 28 to the next desired opening 33 where the reverse threading of the clothes line takes place through the arms 28 in a reverse circular direction. This is continued until the desired length of clothes line is stretched upon the arms 28, when the end of the clothes line is secured to the adjacent arm 28. It is of course understood that various other arrangements of the clothes line may be resorted to to secure the line upon the arms 28.

In use, it is only necessary to set up the standard 10 by projecting the stem 11 thereof in the opening in the base 12. The base 12 may be arranged outside of a building, as in a yard and adjacent a walk, or the like. The hand lever 16 is manipulated to draw the link 19 downwardly and to thus drop the socket 15 upon the foot piece 14. The head is now placed upon the socket by inserting the stem 25 of the head in the upper end of the socket. The head is supported by the shoulder 27 on top of the socket and is free to turn thereon. The arms 28 may be set up in their proper positions with respect to the post 24, before or after the stem 25 is inserted in the socket. When the device is thus set up the clothes may be applied to the line 34 from one side of the device, such as from the pavement or walk above referred to, and the head may be swung around continuously until the clothes line 34 is filled. The handle end of the lever 16 may now be swung downwardly into engagement with the stop hook 23.

This movement elevates the link 19 and slides the socket 15 upwardly through the guides 13 until the pin 20 which connects the link to the arm moves past dead center. The weight of the device then retains the hand lever 16 in engagement against the hook 23. The lever 16 and the link 19 may be made in any desirable length, and thus the height to which the head may be raised can be varied. It is desired, however, to elevate the head sufficiently to hold the clothes line 34 and the clothes hung thereon a suitable distance from the ground and from access by small animals, children, and the like.

When it is desired to take the reel down, it is only necessary to drop the socket 15 by operating the handle 16, when the head may be easily removed and collapsed. The standard 10 may then be lifted out of the base 12 and the device packed away in a relatively small space. It will be noted that as the device is separable into two different parts, it may be more readily carried and the weight more evenly distributed in the two parts. The post 24 of the head may be provided on its upper end with a suitable closure cap 36 of any suitable form to close the upper end of the tubular section and prevent access of snow, rain or the like, to the pivots and other parts of the device.

It is of course understood that various changes and modifications may be made in the details of construction and design of the above specifically described embodiment of this invention without departing from the spirit thereof, the changes and modifications being restricted only by the scope of the following claim.

I claim:

In a clothes line reel, the combination of a standard, a socket member carried by said standard, a head removably carried by said socket member and comprising an axial member including an upper post part and a lower stem part, said lower stem part adapted for insertion into the upper end of said socket and a union coupling connecting the adjacent ends of said upper post part and said lower stem part of said axial member, said union coupling adapted to engage the upper end of said socket to limit the insertion of said lower stem part into the socket and permit rotation of the head, and arms secured to the upper post part directly above the union.

CLARENCE G. NEWLAND.